United States Patent [19]
Pennec

[11] 3,908,312
[45] Sept. 30, 1975

[54] SEAL AND DECORATIVE STRIP ASSEMBLY FOR SLIDING WINDOW OF VEHICLE

[75] Inventor: Jean-Claude Pennec, Billancourt, France

[73] Assignees: Regie Nationale des Usines Renault, Billancourt; Automobiles Peugeot, Paris, both of France

[22] Filed: Nov. 27, 1973

[21] Appl. No.: 419,272

[30] Foreign Application Priority Data
Dec. 6, 1972 France .............................. 72.43344

[52] U.S. Cl. .................................... 49/493; 49/496
[51] Int. Cl.² .......................................... E06B 7/16
[58] Field of Search ............. 49/493, 490, 496, 436, 49/437, 438, 439; 52/716–718

[56] References Cited
UNITED STATES PATENTS

| | | | |
|---|---|---|---|
| 2,180,920 | 11/1939 | Churchill | 49/436 |
| 2,823,071 | 2/1958 | Malpass | 49/440 |
| 3,203,059 | 8/1965 | Becker | 49/490 X |
| 3,304,681 | 2/1967 | Wunderlich | 49/441 X |
| 3,359,688 | 12/1967 | Konolf | 49/496 X |

*Primary Examiner*—Philip C. Kannan
*Attorney, Agent, or Firm*—Stevens, Davis, Miller & Mosher

[57] ABSTRACT

Sliding-window seal for automotive vehicle, comprising a flexible plastic section member associated with at least one fastening clip and with a decorative strip having a substantially C-shaped cross-section, for marking the junction between the seal and the lower, substantially vertical edge of the framing of a sliding glass of vehicle, wherein said fastening clip has a substantially U-shaped cross-sectional contour into which the fastening depending element of said flexible plastic seal is adapted to be inserted, one arm of said U-shaped clip being cut and pressed to provide a pair of opposed lugs somewhat spaced from said one arm, the other arm of said clip being cut and pressed to provide a pair of transverse inclined claws extending somewhat inwards of the clip and adapted to penetrate into said fastening depending element of the seal, said C-sectioned decorative strip and fastening clip being assembled together and with the glass framing by engaging said cut and bent lugs firstly through an elongated hole formed longitudinally along the marginal portion of said glass framing, and then through the open longitudinal slot of said C-sectioned decorative strip pressed against the opposite side of said glass framing, whereafter said clip is rotated through 90° whereby the lugs thereof are caused to engage the inner faces of the edges of said longitudinal slot of said decorative strip and thus lock the assembly in its final condition.

1 Claim, 4 Drawing Figures

U.S. Patent  Sept. 30,1975  3,908,312

SEAL AND DECORATIVE STRIP ASSEMBLY FOR SLIDING WINDOW OF VEHICLE

The present invention relates to an automotive glass seal associated with at least one fastening clip and a decorative strip for the framing or mounting of the sliding glass or window of motor vehicle.

In the French Pat. No. 2,096,689 it is disclosed and illustrated a seal of the type adapted to be fitted to a sliding glass, which consists of a flexible plastic section element associated with at least one fastening clip and also with a decorative strip concealing or marking the junction or joint between the seal and the lower, substantially vertical edge of the frame structure for a sliding glass of the motor vehicle, which is remarkable notably in that said flexible plastic section seal has a substantially T-shaped cross-sectional contour and that its substantially vertical web constitutes a fastening element adapted to be force-fitted into a first, flattened, open-top loop of at least one resilient, S-sectioned clip having another flattened, open-bottom loop fitted astride to said lower, substantially vertical edge of the frame structure, the outer face of said other loop comprising anchoring means engaged by the longitudinal in-turned edges of said seal, one wing of said flexible plastic section being slightly curved upwards to constitute the sealing lip proper engaging the glass surface, the edge of the other wing being slightly inclined downwards and towards the glass and covering the upper portion of said decorative strip.

It is an essential object of the present invention to provide a modified structure of the seal fastening clip with a view to simplify the fitting of the seal, clip and decorative-strip assembly to the glass framing, and also to make this fitting highly reliable by definitively preventing any undesired loosening of this assembly from said framing.

According to this invention and with this object in view, the seal assembly comprising a flexible plastic section associated with at least one fastening clip and with a decorative strip for concealing or marking the junction or joint between said seal section and the lower, substantially vertical edge of the framing of a sliding glass of motor vehicle, is further characterised in that said clip is substantially U-shaped in cross section and has fitted therein the fastening element or web of said plastic seal section, one arm of said clip being cut and pressed to provide a pair of vertically opposed lugs bent and somewhat spaced from the plane of said one arm, the other arm of said clip being cut to provide a pair of spaced claws inclined towards the inside of said clip and adapted to penetrate into the substantially vertical fastening element or depending web of said flexible plastic seal, the assembling operation consisting in causing said opposed lugs to penetrate through an elongate hole formed longitudinally throughout and along the framing edge into the slot of the C-sectioned decorative strip, whereafter the clip is turned in its plane through 90° so that the lugs engage the inner edges of said slot and lock the assembly. The seal is thus retained in said clip by said spaced claws.

Other features and advantages of this invention will appear as the following description proceeds with reference to the typical embodiment of the device constituting the subject-matter thereof as illustrated diagrammatically in the attached drawing. In the drawing.

Figure 1:
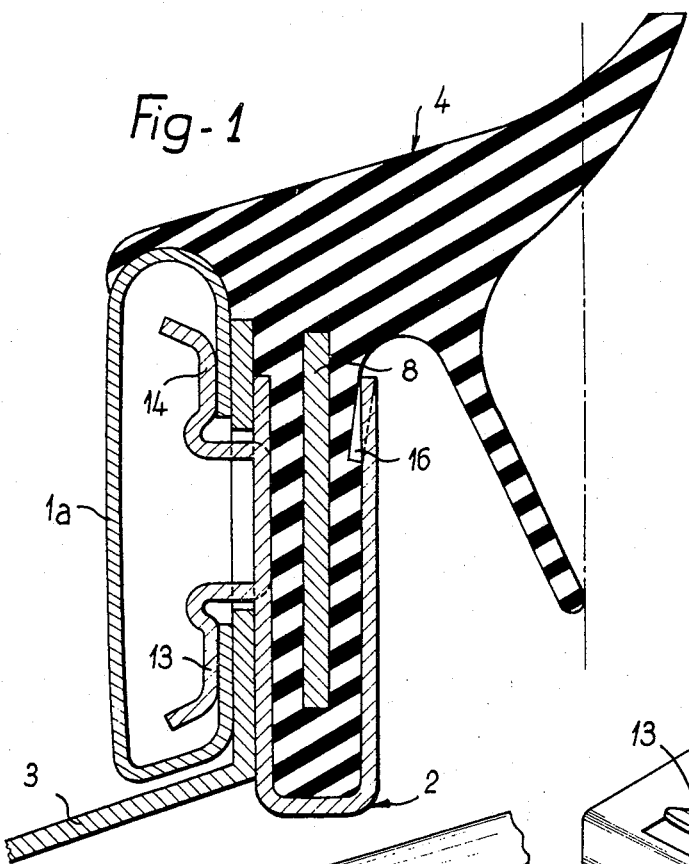
FIG. 1 is a cross-sectional view of the seal assembly fitted to a sliding glass framing.
Figure 3:
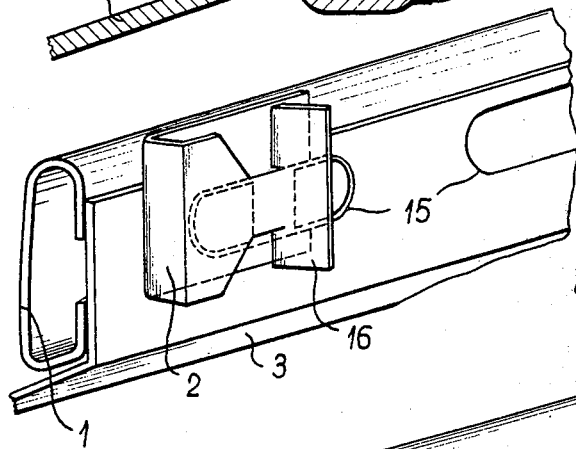
FIG. 3 is a perspective view of the decorative strip, with the edge of the glass framing and the clip as fitted initially.
Figure 4:
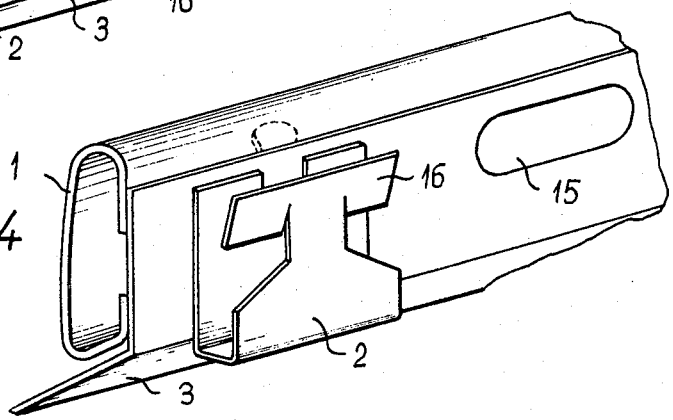
FIG. 4 is a perspective view similar to FIG. 3 but showing the clip in its final position.

As illustrated in FIGS. 1, 3 and 4, the seal-forming flexible plastic section 4 constituting the weather strip adapted flexibly to engage the surface of the sliding glass in a motor vehicle or the like, and the usually chromium-plated strip 1 for decorating the upper edge of the vehicle door equipped with said sliding glass, are assembled by means of at least one U-sectioned clip 2.

The flexible seal section 4 illustrated in cross-section in FIG. 1 comprises essentially a substantially horizontal top portion of which one glass-engaging sealing lip, in the embodiment illustrated, is curved upwards and inwards (with respect to the glass), as shown, the section 4 further comprising another lip thinner than the curved sealing lip and extending substantially obliquely, downwards and inwards, as shown. The opposite edge of said horizontal top portion of seal 4 covers the upper edge of the decorative strip 1; furthermore, the flexible seal section 4 comprises a central depending web, possibly reinforced by an embedded metal core 8.

Figure 2:
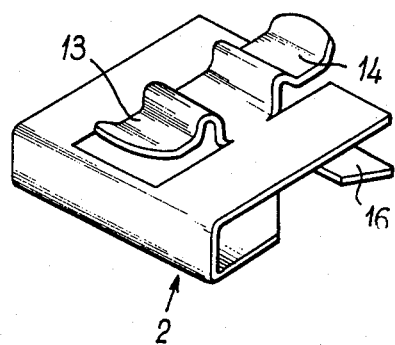
FIG. 2 is a perspective view of the fastening clip alone.

Referring to FIG. 2 illustrating in perspective view the clip 2 alone, it is clear that this clip is substantially U-shaped with one arm (the upper one in FIG. 2) punched and pressed to provide a pair of opposed lugs 13, 14, each lug being bent a first time at right angles away from the outer surface of the arm and then in a manner to provide a lug portion substantially parallel to said outer surface. These lugs 13, 14 are aligned to each other and disposed in the central portion of the arm.

Besides, as shown in FIGS. 3 and 4, elongated holes 15 are formed longitudinally along the lower edge of the glass framing 3, the shape and dimensions of these holes 15 corresponding to those of the outer contour of the assembly of lugs 13 and 14.

The clip, decorative channel strip and seal are assembled as follows:

Firstly, the C-sectioned decorative channel strip 1 is pressed with its open side against the lower edge of the glass framing 3, the longitudinal slot of said strip 1 being disposed level with the elongated holes 15. Then (FIG. 3) the lugs 13 and 14 are introduced into a hole 15 from the free side of the lower edge of framing 3, with the clip disposed as shown in FIG. 3. The clip 2 is subsequently rotated through 90°, to position the open side of the U-shaped clip 1 uppermost. During this rotation the lugs 13 and 14 engage the inner edges of the longitudinal slot of the decorative channel strip 1 so as to lock the assembly.

Preferably, a plurality of such clips 1 are provided along the lower edge of the glass framing, and when all these clips have been properly fitted in position the depending fastening web of seal 2 is inserted into these clips from above. It will be noted that this seal 2 is retained in position in the clips by anchoring means consisting of a pair of spaced claws 16 cut and bent in the other arm of the U-shaped clip; these claws are inclined inwards and their inner edges penetrate into the flexible material of the depending web of seal 2, as shown in FIG. 1.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. A sliding-window seal for an automotive vehicle comprising a flexible plastic seal section member associated with at least one fastening clip and with a decorative strip having a substantially C-shaped cross-section for marking the junction between the seal and the lower, substantially vertical edge of the framing of a sliding glass of a vehicle, said flexible plastic seal section member having a fastening depending element, said fastening clip having a substantially U-shaped cross-sectional contour into which the fastening depending element of said flexible plastic seal section member is inserted, a portion of one arm of said U-shaped clip being cut and pressed to provide a pair of opposed lugs spaced from said one arm, a portion of the other arm of said clip being cut and pressed to provide a pair of transverse inclined claws extending inward of the clip and adapted to penetrate into said fastening depending element of the seal section member, said decorative strip and said fastening clip being assembled together and with the glass framing with the portion of said one arm extending through an elongated hole formed longitudinally along the marginal portion of said glass framing and extending through an open longitudinal slot of said C-sectioned decorative strip pressed against the opposite side of said glass framing and the lugs engaging the inner faces of the edges of said longitudinal slot of said decorative strip to thereby lock the assembly in its assembled condition.

* * * * *